United States Patent

Acton et al.

[15] 3,699,132
[45] Oct. 17, 1972

[54] 8,9-EPOXYPERILLARTINE SWEETENERS

[72] Inventors: Edward M. Acton, Menlo Park; Morris A. Leaffer, Palo Alto; Herbert Stone, Menlo Park, all of Calif.

[73] Assignee: Stanford Research Institute, Menlo Park, Calif.

[22] Filed: Sept. 2, 1970

[21] Appl. No.: 69,165

[52] U.S. Cl. .............................. 260/348 R, 99/141 A
[51] Int. Cl. ............................ C07d 1/00, C07d 1/06
[58] Field of Search ............................ 260/348

[56] References Cited

OTHER PUBLICATIONS

E. Klein et al., Tetrahedron, Vol. 19, pp. 1,091– 1,099 (1963).

Primary Examiner—Norma S. Milestone
Attorney—Donovan J. De Witt and Gregg, Hendricson & Caplan

[57] ABSTRACT

8,9-Epoxyperillartine optical isomers having good sweetness and no or moderately low bitter aftertaste characteristics, along with an increased solubility in water as compared with the corresponding perillartine precursor isomers. These epoxy derivatives are also free of the undesirable gingery-licorice taste of perillartine. The new compounds give no evidence of toxicity and can be employed in foods as synthetic sweetening ingredients.

4 Claims, No Drawings

8,9-EPOXYPERILLARTINE SWEETENERS

BACKGROUND OF THE INVENTION

The various enantiomeric (+ or −) optical isomers of perillartine, as well as racemic mixtures (±) thereof, are known to have utility as synthetic sweetening agents, the (−) perillartine, for example, being called "-perilla sugar" and used as a sweetening agent in Japan. These isomers are the starting materials employed in forming the compounds of this invention, and methods for their preparation are described in French Pat. No. 1,813,849, to Kergomard et al., dated July 15, 1959. Also, a synthesis of (−) perillartine is reported by Ando et al., Science (Tokyo) *17*, 241 (1947), C. A. *45*, 1976 *d* (1951), and methods for isolating this isomer from plant sources are also described in Beilstein, 7, 2nd Suppl., page 130, and in the 3rd Suppl. at page 566. Racemic perillartine is manufactured and sold by Yuki Gosei Kogyo Company in Japan.

Perillartine is commonly described in the literature as being approximately 2,000 times, sweeter than sucrose. However, this sweet taste is accompanied not only by the somewhat bitter aftertaste which is present to a greater or lesser degree with all synthetic sweeteners, but also by a pronounced licorice-like, or gingery-licorice flavor which has ruled out any usage of the product in this country. Perillartine (all optical isomers) has a maximum water solubility, at 25° C., of about 0.0003 M. This concentration is sufficient to provide a pleasantly sweet aqueous solution.

SUMMARY OF THE INVENTION

In accordance with the invention, there are provided novel (+), (−) or (±) 8,9-epoxyperillartine optical isomers having the formula

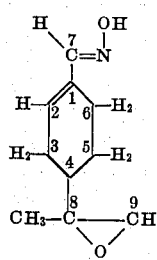

The new compounds are white crystalline solids.

The numbering system used in the foregoing formula is that employed in connection with terpenes such as menthene. By another system of nomenclature, the optical isomers corresponding to the above formula can be designated as 4-(1,2-epoxy-2-propyl)-1-cyclohexene-1-carboxaldehyde, syn-oximes. However, the terpene system of nomenclature indicated in the formula will be employed herein to designate the isomer compounds of this invention.

The optical isomer compounds of this invention, which include the (+), or (d) isomer, the (−), or (l) isomer and the racemic (±), or (dl) isomer mixture are designated as 8,9- epoxyperillartines. In this connection, it may be noted that perillartine has the same formula as that shown above except that no epoxy group is present, and the number 8 and number 9 carbon atoms are joined by an olefinic double bond.

The 8,9-epoxyperillartine compounds hereof are white crystalline materials having a sweetness ranging variously from about 20 to 50 times that of sucrose, and a solubility in water at 25° C. of about 0.003 M, or roughly 10 times that of perillartine. They are highly soluble in ethanol, benzene, acetone and other organic solvents. Further, said compounds have bitter aftertaste characteristics ranging from none to moderate and, quite unexpectedly, they are free of the undesirable gingery-licorice taste which characterizes the corresponding perillartine optical isomers. Aqueous solutions of the 8,9-epoxyperillartine, at concentrations of approximately 0.003 M, are pleasantly sweet and highly palatable. In the dry state the present compounds have an excellent shelf life, and aqueous solutions thereof are stable under weakly basic conditions. They give no evidence of toxicity and are well adapted to be used, in the dry pellet or powder form, as synthetic sweetening agents either alone or in conjunction with other sweetening agents such as sucrose, dextrose, saccharine or the various cyclamates. They are also well adapted to be admixed, in dry form, with other food ingredients such as citric acid, flavoring, spices, starches, preservatives, dehydrated food stuffs and the like.

The 8,9-epoxyperillartines of this invention can be prepared by the oxidation of the corresponding perillartine optical isomer, or isomer mixture, with m-chloroperbenzoic acid. The reaction is carried out by dissolving the perillartine in an organic solvent such as benzene, and then slowly adding m-chloroperbenzoic acid, or a solution thereof in said solvent. A 10–30 percent molar excess of the peracid is normally employed. The ensuing reaction, which is somewhat exothermic, proceeds readily at room or moderately elevated temperatures. Stirring is continued after all the peracid has been added while m-chlorobenzoic acid precipitates out. The system is then filtered, and the filtrate is washed with sodium bicarbonate solution to destroy excess peracid, followed by washing with water.

After being filtered and dried with a suitable solid desicant, the desired 8,9-epoxyperillartine isomer present in the solution can be recovered in good yield by crystallizing the same from solution or by stripping off the solvent in vacuo. The product can be purified by conventional methods such as recrystallization from appropriate organic solvents such as hexane, benzene or absolute ethanol.

During the reaction between the perillartine starting material and the peracid oxidant, it has been found that neither the 1,2-double bond in the ring nor the oxime functional group is affected. Further, the attack of the 8,9-double bond is highly stereoselective in that but one of the two possible stereomeric forms of the epoxide is produced.

DESCRIPTION OF THE PREFERRED EMBODIMENTS

The following examples illustrate the invention but are not to be construed as limiting the same.

EXAMPLE 1

To a stirred solution of 2g (0.0121 mole) of racemic perillartine in 80 ml. benzene at 25° C. is added, in portions over a 10 minute period, 3.2 g (0.0158 mole) of 85 percent m-chloroperbenzoic acid (a powdered dry solid) during which period the temperature rises to 30° C. The resulting solution is stirred for 12 hrs. while m- chlorobenzoic acid is precipitated. The system is filtered and the filtrate is washed first with two 50 ml. portions of saturated aqueous sodium bicarbonate, and then with 50 ml. of water. After being dried with magnesium sulfate, the remaining liquid is concentrated in vacuo, at 25° C., until crystals start to form. These crystals are then dissolved with heating, following which the solution is cooled to induce crystallization of the 8,9-epoxy-perillartine product. On being recrystallized from benzene, the product is recovered as a white solid, mp. 125°–126° C., which is slightly soluble (0.003 M) in water at 25° C. and has good solubility in hexane, benzene, alcohol and other organic solvents. This material is found to be homogeneous by thin-layer chromatography in chloroform-ethyl acetate (1:1) on silica gel, it having $R_f$ 0.52 compared to the (±) perillartine starting material having $R_f$ 0.62. (These properties are the same whether racemic or enantiomeric perillartine is employed as the starting material). The product is identified as (±) 8,9- epoxyperillartine by infrared and nuclear magnetic resonance spectra. This is confirmed by elemental analysis which shows the compound to have carbon, hydrogen and nitrogen contents of 66.47, 8.49 and 7.75 percent, respectively, as against theoretical values for these elements of 66.27, 8.34 and 7.73 percent, respectively.

EXAMPLE 2

The foregoing Example 1 is repeated under essentially the same conditions except that (−) perillartine rather than (±) perillartine is reacted with the m-chloroperbenzoic acid. Here the (−) 8,9-epoxyperillartine obtained as product is also identified by infrared and nuclear magnetic resonance methods of analysis. Elemental analysis shows it to have carbon, hydrogen and nitrogen contents of 66.08, 8.31 and 7.67 percent, respectively, as compared with theoretical values for these elements of 66.27, 8.34 and 7.73 percent, respectively. This compound has a melting point of 116° – 117° C. and an optical activity $[\alpha]_D^{24}$ of −105.6° at 1 percent concentration in ethanol. Its solubility characteristics are the same as those for the racemic isomer mixture of Example 1.

EXAMPLE 3

Again following the procedure of Example 1, but substituting (+) perillartine for the (±) perillartine starting material, there is obtained (+) 8,9-epoxyperillartine as a white solid having a molecular weight of 165.24. This compound has somewhat reduced sweetness and a higher bitter aftertaste than either the racemic isomer mixture or the (−) isomer of the foregoing examples. Its solubility characteristics are the same, however, as those of the other isomer materials. This compound, it will be noted, forms approximately one-half of the isomer mixture of Example 1.

EXAMPLE 4

Taste tests by a panel consisting of 6 subjects are conducted to evaluate the relative sweetness characteristics of the (±) and the (−) 8,9-epoxyperillartine of Example 1 and 2, respectively. In these tests each subject matches the sweetness of a given aqueous solution of either the (±) or the (−) compound with that of one of a series of sucrose solutions, each of a different concentration. It is found that the racemic (±) isomer mixture at a level in water of 0.054 percent (0.003 M) tastes relatively sweet and is equal in this respect to a 3.1 percent (0.09 M) aqueous solution of sucrose, its relative sweetness thus being at least 30 times that of the reference sucrose material.

Similarly, the (−) 8,9-epoxyperillartine at the same concentration (0.003 M) is found to be equal in sweetness to a 4.1 percent (0.12 M) sucrose solution on this direct comparison basis. Its relative sweetness is thus about 40 or more times that of sucrose. Further, the 0.003 M solution of this (−) isomer, while pleasantly sweet, is moderately sweeter than the 0.003 M solution of the (±) isomer.

EXAMPLE 5

In another taste test by the panel of six subjects, the relative qualities of sweetness, bitterness and other flavors are evaluated for the compounds of Examples 1 and 2 hereof. In this test, each compound, in aqueous solution, is tasted a total of 12 to 36 times by the members of the panel. The data obtained by the panel show that, out of a total taste score of 100 percent, the racemic 8,9-epoxyperillartine isomer mixture of Example 1, at concentrations of both 0.002 M and 0.003 M, has a sweetness of 70 to 72 percent and a bitterness of 15 percent. The balance (13 to 15 percent) is attributable to other taste qualities, none of which is objectionable to the palate. In particular, there is no characteristic perillartine flavor.

In tests with the (−) 8,9-epoxyperillartine isomer of Example 2, the solutions of both 0.002 M and 0.003 M show a sweetness of 92 to 94 percent, no bitterness, and 6 to 8 percent of other taste qualities of an unobjectionable, non-perillartine character.

EXAMPLE 6

The isomer compounds of this invention are non-toxic. This is determined in experiments wherein the racemic isomer mixture, as prepared in Example 1, is injected I. V. into rats weighing 180 – 200 g at rates as high as 300 mg. per kg of body weight, over 24 hours.

Similarly, this same compound is injected I.P. into rats and into mice (18 – 20 g) at rates as high as 30 mg per kg of body weight, over 24 hours. In making these injections, the chemical is dissolved in a 5 percent solution of propylene glycol in water. From this work the conclusion is drawn that this sweetener compound does not cause death and does not give any evidence whatsoever of toxicity.

We claim:

1. An enantiomeric isomer of 8,9-epoxyperillartine or mixtures thereof.
2. An enantiomeric isomer according to claim 1 which is (−) 8,9-epoxyperillartine.
3. An enantiomeric isomer according to claim 1 which is (+) 8,9-epoxyperillartine.
4. A racemic or other mixture of (−) 8,9-epoxy-perillartine and (+) 8,9-epoxyperillartine, according to claim 1.

* * * * *